United States Patent

Nagin

[15] 3,672,237
[45] June 27, 1972

[54] LOAD SUPPORTING CHAIN AND SPROCKET SUPPORTING STRUCTURE THEREFOR

[72] Inventor: Tony Nagin, 14016 South Indiana Avenue, Chicago, Ill. 60627

[22] Filed: Sept. 29, 1969

[21] Appl. No.: 861,582

[52] U.S. Cl. ............................................ 74/89.21, 198/37
[51] Int. Cl. ........................................................ F16h 27/02
[58] Field of Search .................. 74/89.21; 305/47, 48, 49; 214/514, 34; 198/137; 187/17

[56] References Cited

UNITED STATES PATENTS

| 980,181 | 1/1911 | Asbury | 214/34 |
| 2,474,057 | 6/1949 | Le Tohrneau | 305/47 |
| 3,021,024 | 2/1962 | Nagin | 214/514 |
| 3,082,893 | 3/1963 | Hollings et al. | 214/34 |
| 2,718,153 | 9/1955 | Dean | 198/137 |
| 2,818,189 | 12/1957 | Schreck | 214/514 |

Primary Examiner—William F. O'Dea
Assistant Examiner—Wesley S. Ratliff, Jr.
Attorney—Hill, Sherman, Meroni, Gross & Simpson

[57] ABSTRACT

A compression chain arrangement comprising a plurality of roller chain links having connecting plates which have a configuration such that the connecting plates abut end to end when the chain is disposed along a straight line to provide a structure that is rigid in such line, but permit the chain to flex in one direction transverse to such line but not in the opposite direction, said chain being meshed with the teeth of a sprocket disposed at the side of the chain which will permit flexing of the latter about the sprocket, the outermost edges of the roller connecting plates being arcuate in shape and disposed, as they pass around the sprocket, in an arc concentric with the sprocket axis, means being disposed adjacent to and engageable with the concentrically positioned edges for guiding said plates as they pass around the sprocket.

6 Claims, 4 Drawing Figures

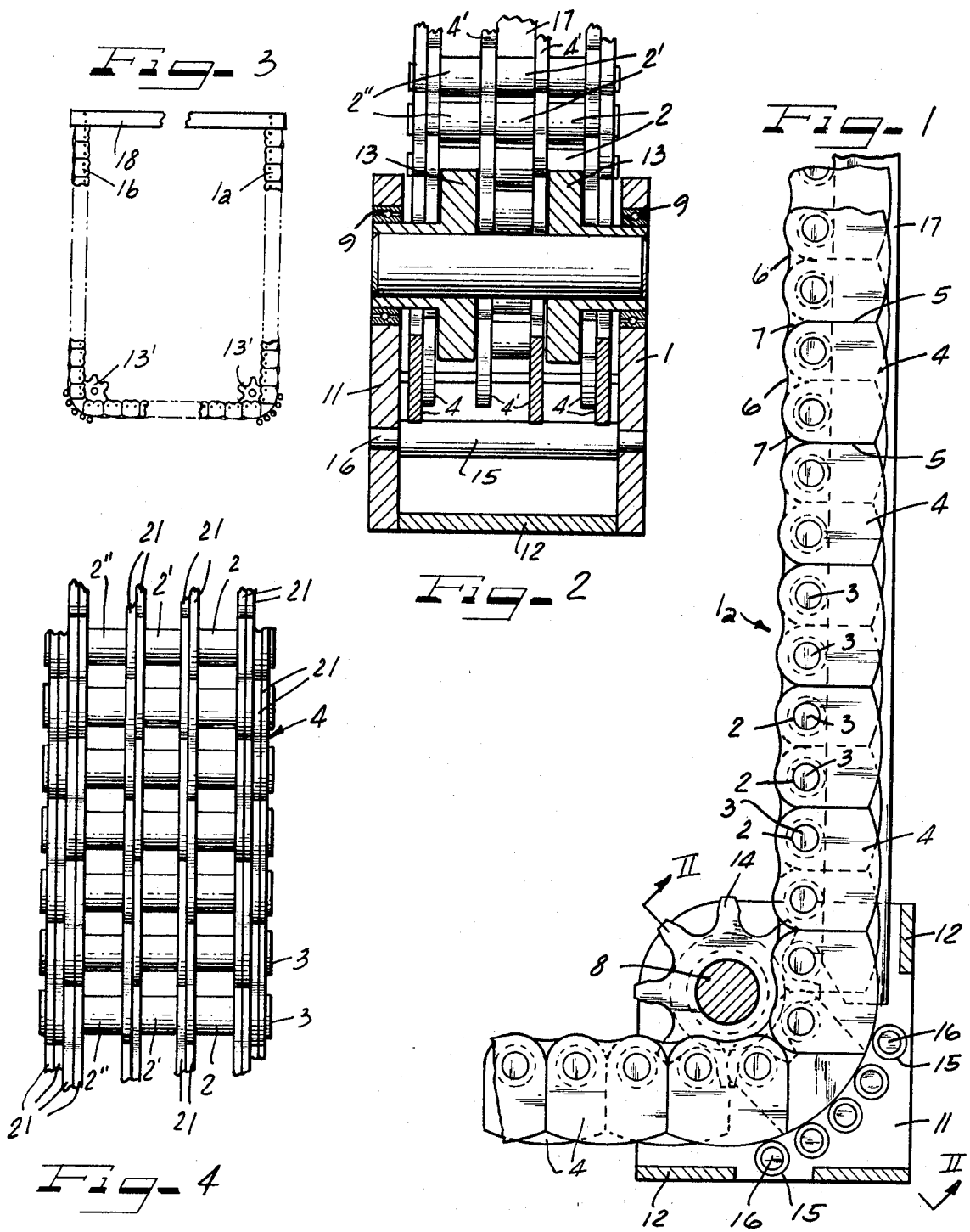

LOAD SUPPORTING CHAIN AND SPROCKET SUPPORTING STRUCTURE THEREFOR

BACKGROUND OF THE INVENTION

Roller chain structures adapted to be load supporting in compression are known, for example such as that illustrated in my prior U.S. Pat. No. 3,021,024 granted Feb. 13, 1962 in which chains of this general type are utilized to operate a pusher mechanism for a fork lift truck or the like.

In a construction such as that described in the above referred to patent, the compression loads are transferred to and substantially wholly carried by the teeth of the sprocket. In such a case, while the chain may pass around a part of the sprocket, for example, approximately 90° thereof, one tooth on the sprocket will carry the greatest load with at most several other teeth carrying a lesser part of the load. Consequently, to offset this disadvantage the chain may be made as a multiple chain with a plurality of sprockets being employed whereby the load is distributed over the teeth of the several sprockets rather than a small number of teeth of one sprocket.

BRIEF SUMMARY OF THE INVENTION

The present invention is therefore directed to the production of a chain structure and sprocket supporting structure therefor in which the chain is provided with support as it passes around the sprocket and compression loads are divided over a relatively large number of teeth on the sprocket.

This is accomplished in accordance with the invention by so constructing the outer edges of the abutting side plates through which compression stresses are transmitted, that such outer edges have an arcuate configuration which will be concentric with the sprocket axis as the chain passes around the sprocket.

Cooperable with such arcuate edges are a plurality of guide members, as for example, suitably supported rollers having their axes extending parallel to the axis of the sprocket and disposed to guidingly engage such arcuate edges as the chain passes around the sprocket. As the roller connecting side plates of the chain are staggered in relation, a continuous circular substantially continuous surface is engageable with the rollers to assure a smooth movement of the chain around the sprocket. At the same time, as the chain cannot draw away from the sprocket as it passes around the same, the compression forces are in effect also effectively transmitted around the sprocket axis to the chain whereby the compression load thereon is distributed over a larger number of teeth on the sprocket.

In practicing the invention the respective side plates may be constructed as solid members or as laminated members.

BRIEF DESCRIPTION OF THE DRAWINGS

Other objects, features and advantages of the invention will be readily apparent from the following description of certain preferred embodiments thereof, taken in conjunction with the accompanying drawing, wherein like reference characters indicate like or corresponding parts, although variations and modifications may be effected without departing from the spirit and scope of the novel concepts of the disclosure, and in which:

FIG. 1 is a section through a chain constructed in accordance with the invention illustrating the details of construction;

FIG. 2 is a sectional view taken approximately on the line II—II of FIG. 1;

FIG. 3 is a schematic view of two cooperable chains connected by a guide member; and FIG. 4 is a plan view illustrating a modified form of the invention.

DETAILED DESCRIPTION OF THE INVENTION

Referring to the drawings and more particularly to FIGS. 1 and 2, the reference numeral 1 indicates generally a compression-type chain comprising a plurality of rollers 2, respectively supported on cooperable pins or rivets 3, and connected by a plurality of side plates 4, with such plates connecting successive pairs of rollers and pins. Assuming that the chain is a multiple roller-type chain, as illustrated in FIG. 2, three sets or series of rollers 2, 2' and 2" will be employed. In the particular embodiment illustrated, all of the plates 4 are of like construction, each having a pair of parallel end edges 5 generally concave edge 6 adapted to pass around a sprocket and an arcuate convex edge 7. Each of the side edges 5 is connected to the concave edge 6 by a convex corner portion 7. In the particular embodiment illustrated in FIGS. 1 and 2, two rows of side plates 4 are disposed adjacent the outer ends of the outermost series of rollers, while only a single row of intermediate plates 4' are disposed between respective series of rollers. Thus the outer ends of each rivet 3 is connected by a side plate to the next adjacent rivet in leading direction and by another side plate to the adjacent rivet in the trailing direction. However, as only a single row of intermediate plates 4' are employed, each rivet 3 will be connected intermediate one adjacent pair of roller series by a side plate with one adjacent rivet and intermediate the other adjacent pair by a side plate with the other adjacent rivet.

The chain 1 passes around a shaft 8, supported for example by suitable bearings 9 mounted in respective side plates 11 which are connected by a plurality of cross members 12, the shaft carrying a pair of sprockets 13 and teeth 14 of which are illustrated as being meshed with the outer series of rollers 2 and 2" respectively. Also extending between and carried by the respective plates 11 are a plurality of rollers 15, illustrated as being freely rotatable on respective shafts 16 rigidly carried by the side members 11. As will be apparent from a reference to FIG. 1, the periphery of the rollers 15 are disposed to engage the arcuate surfaces 7 of the side plates 4 and intermediate plates 4' with such side plates rotating as a unit about the axis of the shaft 8. The rollers 15 thus provide a degree of support for the upstanding portion of the chain and at the same time directs the chain around the sprocket and effectively enables a distribution of the compression forces on the chain to a plurality of sprocket teeth. The rollers 15 may be supported on needles or other bearings as may be desired.

Guiding means such as a bar 17 disposed between the intermediate plates 4' upon the inner edge of which the rollers 2 may bear, prevents a displacement of the chain in a direction towards such guide member.

As illustrated in FIG. 3, two chains 1a and 1b, such as that described may be disposed in opposing relation with their upper free ends connected by a suitable cross member 18 whereby the two chain structures will be substantially self-aligning with one chain opposing the motion of the other chain in flexing direction. In this construction the two sprockets 13' are suitably arranged or connected to rotate simultaneously in opposite directions. Obviously, as long as the guide member 17 is of a length to establish the direction in which the chain is to travel, the two chains may be simultaneously moved with such chains travelling in spaced parallel planes.

FIG. 4 illustrates the use of side plates of laminated construction wherein each side plate 4 comprises two relatively thin sheets or plates 21 which are identical in configuration to the side plates 4 of FIG. 1. The particular embodiment illustrated utilizes three series of rollers 2, 2' and 2" with intermediate side plates being disposed between each adjacent set of rollers. However, in this construction as the intermediate plates 4' likewise employ a laminated construction, the intermediate plates may be staggered whereby an intermediate plate 4' from each of the intermediate series connects a rivet 3 with the next adjacent leading rivet while the other two intermediate plates connect such rivet with the adjacent trailing rivet. Consequently, connections extend between all adjacent rivets, not only along the edge of the chain structure but at each intermediate series of plates. Obviously the operation of the chain of FIG. 4 would be identical with that of FIG. 1 insofar as its connection with the sprockets and engagement with the rollers 15.

It will be appreciated that the present invention enables the production of a compression chain structure which is effectively supported and guided as it passes around a sprocket assembly.

I claim as my invention:

1. A compression chain arrangement for transmitting compression forces in a single straight line, comprising a plurality of rollers and a plurality of roller chain links having roller connecting plates each of which have parallel end edges extending perpendicular to a line extending between the axes of rollers connected thereby, whereby each of such edges of a side plate will abut the like edge of an adjacent plate in compression transmitting relation when such plates are disposed along said line of compression forces but permit said chain to flex in one direction transverse to said line but not in the opposite direction, said connecting plates being arranged in two rows at each side of the chain, supporting pins, each carrying one of said rollers, each pin being connected at its outer ends by a connecting plate of one row with the adjacent leading pin, and by a connecting plate of the other row with the adjacent trailing pin, a sprocket having teeth meshed with said chain, said sprocket being disposed at the side of said chain which will permit flexing of the latter about said sprocket, the outermost edges of said side plates being arcuate in shape and disposed in an arc concentric with the sprocket axis as they pass therearound, and a plurality of freely rotatable rollers mounted on fixed axes extending parallel to one another and the sprocket axis and lying in an arc concentric thereto, a plurality of said rollers having their axes lying in planes extending parallel to said line of compression forces and intersecting abutting end edges of plates disposed therealong, whereby compression forces on said chain along said line in a direction toward said rollers are distributed between teeth on said sprocket and a plurality of said rollers.

2. A compression chain arrangement according to claim 1, wherein said chain is of multiple construction having a plurality of series of rollers, said connecting plates being arranged in two rows at each side of the chain and a single row between adjacent roller series, supporting pins, each carrying a roller from each series, each pin being connected at its outer ends by a connecting plate of one row with the adjacent leading pin and by a connecting plate of the other row with the adjacent trailing pin, each pin being connected by a connecting plate of an intermediate row with the adjacent leading pin and by a connecting plate of another intermediate row with the adjacent trailing pin.

3. A compression chain arrangement according to claim 1, wherein said chain is of multiple construction having a plurality of series of rollers, said connecting plates being of laminated construction, each comprising a pair of plate members, said connecting plates being arranged in two rows at each side edge of the chain and a single row between adjacent roller series, supporting pins each carrying a roller from each series, each pin being connected at its outer end by a connecting plate of one row with the adjacent leading pin and by a connecting plate of the other row with the adjacent trailing pin, each pin being connected by one plate member of a pair of an intermediate row with the adjacent leading pin and by the other plate member of such pair with the adjacent trailing pin.

4. A compression chain arrangement according to claim 1, comprising in further combination guide means extending along a line parallel to the direction of said chain adapted to guidingly engage said chain and restrict flexing movement thereof.

5. A compression chain arrangement according to claim 1, wherein two chains are provided, which are adapted to be extended along respective parallel lines, each chain being engaged with a respective sprocket, the respective axes of which extend parallel to each other, with said chains passing around the respective sprockets and extending in the same direction with respect to the plane of said axes and arranged to flex in opposite directions, and rigid means, connecting the free ends of said parallel extending portions of said chains, which opposes flexing movement of either chain with respect to the other.

6. A compression chain arrangement according to claim 5, wherein a guide member is provided for each chain, each guide member extending in the direction of the respective extended portions of the chains and adapted to guidingly engage the associated chain and oppose transverse flexing movement of such chain.

* * * * *